US008504541B2

(12) United States Patent
Tamas et al.

(10) Patent No.: US 8,504,541 B2
(45) Date of Patent: Aug. 6, 2013

(54) FILE MANAGEMENT METHOD

(75) Inventors: Alexis Tamas, Paris (FR); Amaury Grimbert, Paris (FR)

(73) Assignee: STG Interactive S.A., Paris (FR)

( * ) Notice: Subject to any disclaimer, the term of this patent is extended or adjusted under 35 U.S.C. 154(b) by 356 days.

(21) Appl. No.: 12/526,724

(22) PCT Filed: Feb. 12, 2008

(86) PCT No.: PCT/FR2008/000177
§ 371 (c)(1),
(2), (4) Date: Oct. 1, 2009

(87) PCT Pub. No.: WO2008/113921
PCT Pub. Date: Sep. 25, 2008

(65) Prior Publication Data
US 2010/0106696 A1    Apr. 29, 2010

(30) Foreign Application Priority Data
Feb. 13, 2007   (FR) ...................................... 07 53222

(51) Int. Cl.
*G06F 7/00*       (2006.01)
*G06F 17/30*      (2006.01)
(52) U.S. Cl.
USPC .......................................... 707/704; 707/829
(58) Field of Classification Search
USPC ........................... 707/687, 704, 821, 828, 829
See application file for complete search history.

(56) References Cited

U.S. PATENT DOCUMENTS

| 5,692,178 | A | 11/1997 | Shaughnessy |
| 5,742,817 | A | 4/1998 | Pinkoski |
| 5,864,852 | A * | 1/1999 | Luotonen ........................ 726/14 |
| 5,893,086 | A * | 4/1999 | Schmuck et al. ..................... 1/1 |
| 6,470,345 | B1 | 10/2002 | Doutre et al. |
| 6,625,591 | B1 | 9/2003 | Vahalia et al. |
| 6,687,716 | B1 * | 2/2004 | Bradley ......................... 707/822 |
| 6,912,645 | B2 * | 6/2005 | Dorward et al. ............. 711/216 |
| 2003/0140051 | A1 * | 7/2003 | Fujiwara et al. ............. 707/100 |
| 2004/0236761 | A1 | 11/2004 | Both |
| 2006/0168450 | A1 * | 7/2006 | Yagawa ........................ 713/176 |

FOREIGN PATENT DOCUMENTS

| EP | 0 463 874 A2 | 1/1992 |
| EP | 1 452 981 A2 | 9/2004 |

OTHER PUBLICATIONS

Bressoud T. C. et al: "Open CAS: A Flexible Architecture for Content Addressable Storage." Proceedings of the ISCA International Conference, Parallel and Distributed Computing Systems, XX,XX, Sep. 15, 2004, pp. 580-587.
Liba Svobodova, "File Servers for Network-Based Distributed Systems", Computing Surveys, Dec. 1984, pp. 353-398, vol. 16, No. 4, IBM Zurich Research Laboratory, Rushlikon, Switzerland.
William H. Paxton, "A Client-Based Transaction System to Maintain Data Integrity", Proceedings of the Seventh ACM Symposium On Operating Systems Principles, 1979, pp. 18-23, Xerox Palo Alto Research Center, New York.

* cited by examiner

*Primary Examiner* — James E Richardson
(74) *Attorney, Agent, or Firm* — Harness, Dickey & Pierce, P.L.C.

(57) ABSTRACT

A method includes constructing a tree of directories including M levels. M is an integer greater than 1, the tree includes a set of N directories of level 1, and N is an integer greater than 1. For each level X from 1 to M−1, each one of the directories of level X includes a set of N directories of level X+1. Storing a first file having a first identifier includes applying a hash function to the first identifier to generate a first hash, selecting a destination directory from level M by traversing the tree in response to the first hash, and storing the first file into the destination directory.

18 Claims, 10 Drawing Sheets

FILE MANAGEMENT METHOD

CROSS-REFERENCE TO RELATED APPLICATION

This application is a National Stage entry of International Application No. PCT/FR2008/000177, filed Feb. 12, 2008, which claims priority to French patent application Ser. No. 07/53222, filed Feb. 13, 2007, the disclosure of the prior applications is hereby incorporated in their entirety by reference.

The present invention concerns the field of the management of digital files, and more particularly the recording, reading and modification thereof on a recording medium. More precisely, it concerns a method and system for managing data files interacting with a file system particular to the operating system of the computer.

Normally, a new data file is recorded at a location in a memory, for example on a hard disk, according to the availability of memory space. In the case of recording on a hard disk, the latter is organized in blocks initialized at the time of formatting. These blocks are distributed at the time of formatting on physical sectors of the memory.

The management of data files on a computer is performed by the file system of the computer operating system.

The file system of an operating system uses one or more partitions on a recording medium. A partition comprises a storage space intended for recording any data files, and an indexing space in which the characteristics of the storage space are recorded, in particular the addresses of the files in the storage space.

Some files constitute directories, grouping together lists of characteristics relating to data files and to directories belonging to the same partition.

For recording media having a storage volume of a large size, for example several gigabytes, the performances of the indexing system of the file system are degraded when the number of data files to be recorded, read or modified becomes great in one and the same directory. This is because the organization of the files that are directories comprises a list containing a very high number of occurrences to be processed, which prohibitively increases the access time to a file when the number of data files reaches several tens of thousands. This degradation is increased by the phenomena of fragmentation of files that are directories occurring when a data file must be renamed or deleted.

Another organization mode known through the Linux EXT3 file system proposes an organization of files that are directories comprising an internal indexing system of the B-Tree type and, for each data file, the calculation of a digest of the name of the data file from the result of a hash function, in order to accelerate the search in the directories containing a large number of data files. This solution makes it possible to use several hundreds of thousands of data files in the same directory. However, beyond a certain threshold, the limits of the hash function no longer make it possible to avoid collisions leading to the allocation of the same digest to two data files with distinct names. For the EXT3 file system, this limit appears as soon as the number of data files reaches approximately 500,000 in the same directory, for versions of the Linux 2.6 kernel.

In the prior art the U.S. Pat. No. 5,742,817 is known, describing a file server, proposing a file consultation method the purpose of which is to simplify the processing of addressing. This document proposes to accelerate access to files by a processing of the INODE identification attributed automatically by the file system. This processing consists of extracting from this identifier three hexadecimal data items to which sub-directories correspond in the file system.

The American patent application US 2004/0236761 describes a system of recording files in a series of directories and sub-directories. In the last level of a tree, processing is carried out consisting of calculating a digest that depends on the name of the file for determining a "HASH SLOT" sub-directory in which the said file is recorded.

In other words, the memory space is organized in a conventional tree form and, at the last level of the tree, a processing determines the sub-directory in a set at a single level.

This solution limits the number of files able to be recorded. The number of sub-directories is limited by the addressing modes of the file system, for example 65,536 for a file system of the UNIX type.

In addition, the same limit also applies to the number of files within each aforesaid sub-directory.

In summary, the capacity is limited and, to use the capacity fully, it is necessary to maximize the number of sub-directories, which limits the performance of the file system in this "rake"-like, single level of sub-directories.

The aim of the present invention is to remedy this drawback by proposing a robust and rapid file management method making it possible to use a number of data files limited solely by the space available in the memory rather than by the processing operations performed by the file system on the names of the data files. The solution according to the invention is therefore not limited by the capacity to use mass storage memories, the only limit being the physical capacity of these memories rather than the operating modes offered by the operating system. It makes it possible to manage very large numbers of data files, for applications such as file servers.

In its most general sense, the invention concerns a file management method, comprising a first step of organizing the base of data files consisting of creating a tree of directories with M levels, each having N directories, with M being an integer greater than 1, and steps of recording the data files consisting of:
   applying a hash function to the identifier of a data file $F_i$ to be recorded,
   determining the path of the destination directory $R_{di}$ in the tree of several levels, according to the result of the previous step,
   recording the data file in the said directory $R_{di}$ determined by the said hash function, at a location that depends on the identifier of the data file,
and steps of reading data files consisting of:
   applying the same hash function to the identifier of a data file $F_j$ to be read,
   determining the path of the target directory $R_{cj}$ in the tree according to the result of the previous step,
   reading the data file in the said directory $R_{cj}$ determined by the said hash function, at a location that depends on the identifier of the data file.

To use storage units in parallel and improve performance (speed of access and/or memory volume), the invention concerns, according to a particular embodiment, a file management method according to the preceding claim, characterized in that the data files are distributed over Q storage units, each storage unit corresponding to P directory levels of N directories.

Contrary to the teaching of the patent application US 2004/0236761, this solution results in restricting the number of directories at each level of the tree, which improves performance and in particular the speed of access to the data files in a tree with two dimensions and to make almost unlimited the number of data files able to be recorded. The limitation is no longer dependent on the limitations of the file system but only on the physical capacities of the storage medium.

Contrary to the solution of the prior art, the invention, by applying the hash function, attributes a path in a tree having a plurality of levels and does not attribute a location in a given directory. The location in the sub-directory of the last level is not attributed by the hash function but by a name associated with the identifier of the data file.

Advantageously, N is equal to 16, and the hash function is the SHA-1 function.

A supplementary problem with file management concerns the protection of the integrity of the data in the case of simultaneous access to the same data file by two applications.

It is known, on the majority of operating systems, that it is possible to proceed with locking data files at the level of the file system, making it possible at a given moment to prevent access to a data file in the process of being written or read. These solutions are managed by the file system, generally from a locking table residing in memory. The drawback of these solutions is that, in the case of access to a file over a network, interference or errors may occur in the event of access to the same file by a plurality of distant computers.

The U.S. Pat. No. 6,850,969 proposes a particular solution for avoiding the use of locking. This patent proposes an a posteriori control of the possibility for an application to record modifications in an open data file and guarantees that, during this so-called atomic operation, no other application has intervened on the same data file. Atomic within the meaning of the present patent means a set of indivisible tasks executed consecutively without possibilities of interruption, nor interference by a third-party operation, before completion of all the tasks of the so-called atomic operation.

This solution is not satisfactory since it prevents the completion of some operations when several applications perform processing operations at the same time on a set of files in common. It certainly makes it possible to avoid alteration to existing data files but the detriment of concurrent secure access. This is because this solution makes it necessary for each processing to occur after the previous one is completed. It is therefore not really adapted to processing operations on files containing, for example, data in the XML format and which may be used at any time by different competing applications.

To this end, the invention also concerns a file management method characterized in that each data file has a header and a body. The header comprises A state parameters of the data file in the file management system. The body comprises the modifiable content of the file. The method comprises a step of access to a target data file causing the modification of one of the said state parameters to a state preventing new access.

Management of these data files is independent of the file system of the computer operating system.

The invention will be better understood from a reading of the following description, corresponding to non-limitative example embodiments, referring to the accompanying drawings, where.

Figure 1:
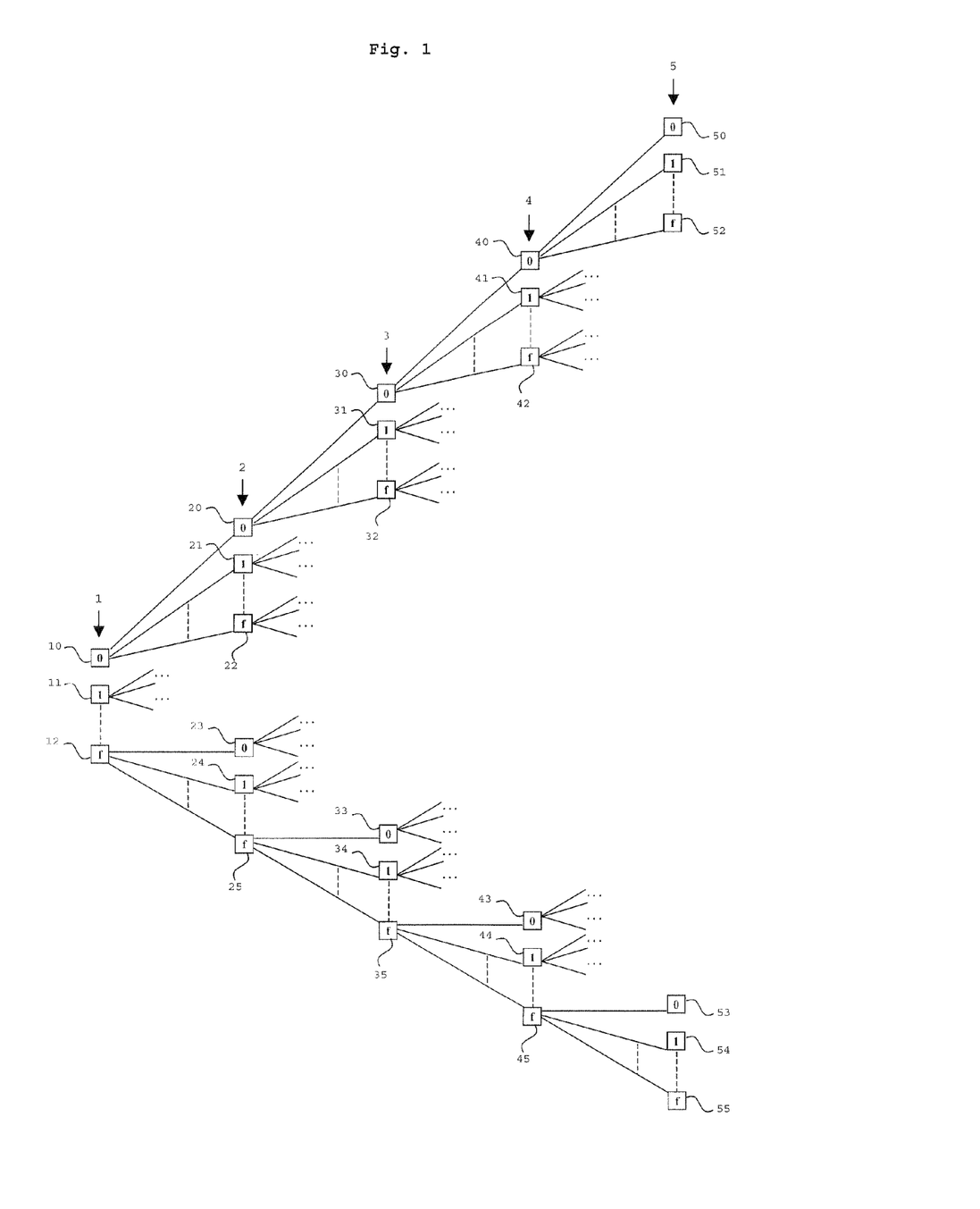
FIG. 1 shows a schematic view of the tree used by the file management method according to the invention and FIG. 1A shows a flowchart of an example implementation of the method.

The data files are organized in a structure sub-divided, in the example described, into M=five levels (1 to 5). Each directory of each level (1 to 4), apart from the last level (5), contains N=16 directories (10 to 12), (20 to 25), (30 to 35), (40 to 45). The name of each of the 16 directories corresponds to a hexadecimal figure between 0 and f. The total number of directories contained in the structure is $16+16^2+16^3 \ldots +16^M$.

In the example described, the tree comprises:
69,904 directories of levels 1 to 4, not containing data files, but only sub-directories;
1,048,576 directories (50 to 55) of level 5; each directory containing files for storing data files.

Each directory (50 to 55) of the last level (5) can contain a limited number L of data files, L being chosen small, for example around 1,000 to allow rapid access time, whatever the file system of the computer operating system.

Attribution of a Memory Location to a Data File

Figure 1A:
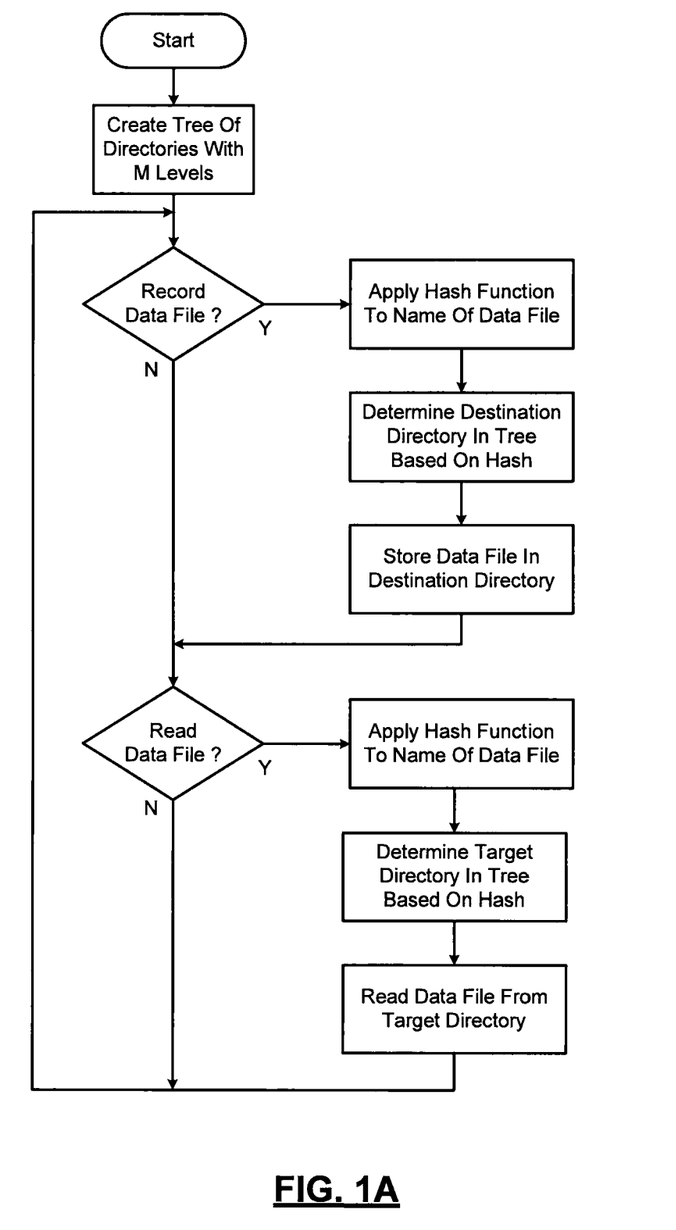

When a new data file is created, designated by a single use name formed by a character string, the method consists of applying a hash function $H_i$ to this character string representing the use name, the result of which will consist of a value represented in a hexadecimal form. For a hash function SHA-1, the result in hexadecimal form will comprise 40 hexadecimal figures between 0 and f.

The method consists of determining, in the context of the directory tree defined above and from this result of the hash function, a directory path in the said tree.

The rank of each of the first M figures of the result of the hash function will correspond to a level of the directory tree.

If an example of a use name "myfile" is taken, the application of the SHA-1 function returns the value "b3580ab45cb088ba47ff070aa81c2dae1be56ca2".

The directory of level 1 will be that bearing the name "b", corresponding to the first character of the SHA-1 value, the directory of level 2 will be "3", corresponding to the second character, and so on for the five levels (1 to 5). The location in the last directory (5) will consist of the two-figure hexadecimal representation of the bytes of each of the characters constituting the use name. For the name "myfile", the location and name of the file will be 6d7966696c65", "6d" corresponding to the two-figure hexadecimal representation of the character "m", "79" corresponding the two-figure hexadecimal representation of the character "y", "66" corresponding to the two-figure hexadecimal representation of the character "f", and so on.

For characters requiring coding in several bytes, all the bytes will be successively represented in this form.

Because of the uniqueness of the use name of the data file, the designation of the file will necessarily be unique since it results from the combination of a location calculated from the hash function and a data file name calculated uniquely from the use name.

This solution makes it possible to distribute, in an equiprobable fashion and with maximum dispersion, the data files in the directory of level M of the directory tree. Only the level M contains data files, the intermediate levels not containing data files and serving only for the distribution of the files in the directories of level M.

Within each directory of level M, the number of data files is reasonably limited, for example to around 1,000, which leads to fast access times. The maximum number of data files that can be created in a tree of level M is equal to $1{,}000 \times 16^M$. For example, for M=5, it is possible to create, read or write approximately 1 billion data files in a tree of directories of level M.

Creation, Writing, Reading and Deletion of a Data File

The first step consists of determining, from the use name of the file, its access path in the tree and its associated file name, by applying the previously mentioned hash function and by calculating the name of the file from the use name. This step makes it possible to determine in which directory of level M the file is recorded and its location in this directory.

Competing Access to the Same Data File

To allow secure management of access to the data files, the latter each comprise a header and a body. The body comprises the modifiable content of the file, in a directly accessible form or in a compressed or enciphered form. This body is preceded by a header containing state parameters of the file in the file management system.

Systematically, access to a file by processing, for a series of any operations (writing, reading, modification or deletion), consists of a first acquisition step consisting of modifying one of the said state parameters of the header to a state preventing further access by another processing operation.

Naturally, when the file is being accessed or used by a processing operation, another processing operation will, during this initial acquisition step, encounter notification of prohibition or waiting.

The other processing operation reiterates this initial acquisition step until the target file is once again in a state allowing access, or until a predetermined time delay causes the interruption of the attempts at access.

Once the series of operations has been completed by the processing operation, a last release step restores the initial state of the modified parameter in the header, thus allowing another processing operation to access the data file.

FIGS. 2 to 8 show the structures of functions used by the invention.

Function of Acquiring an Existing Data File

Figure 2:
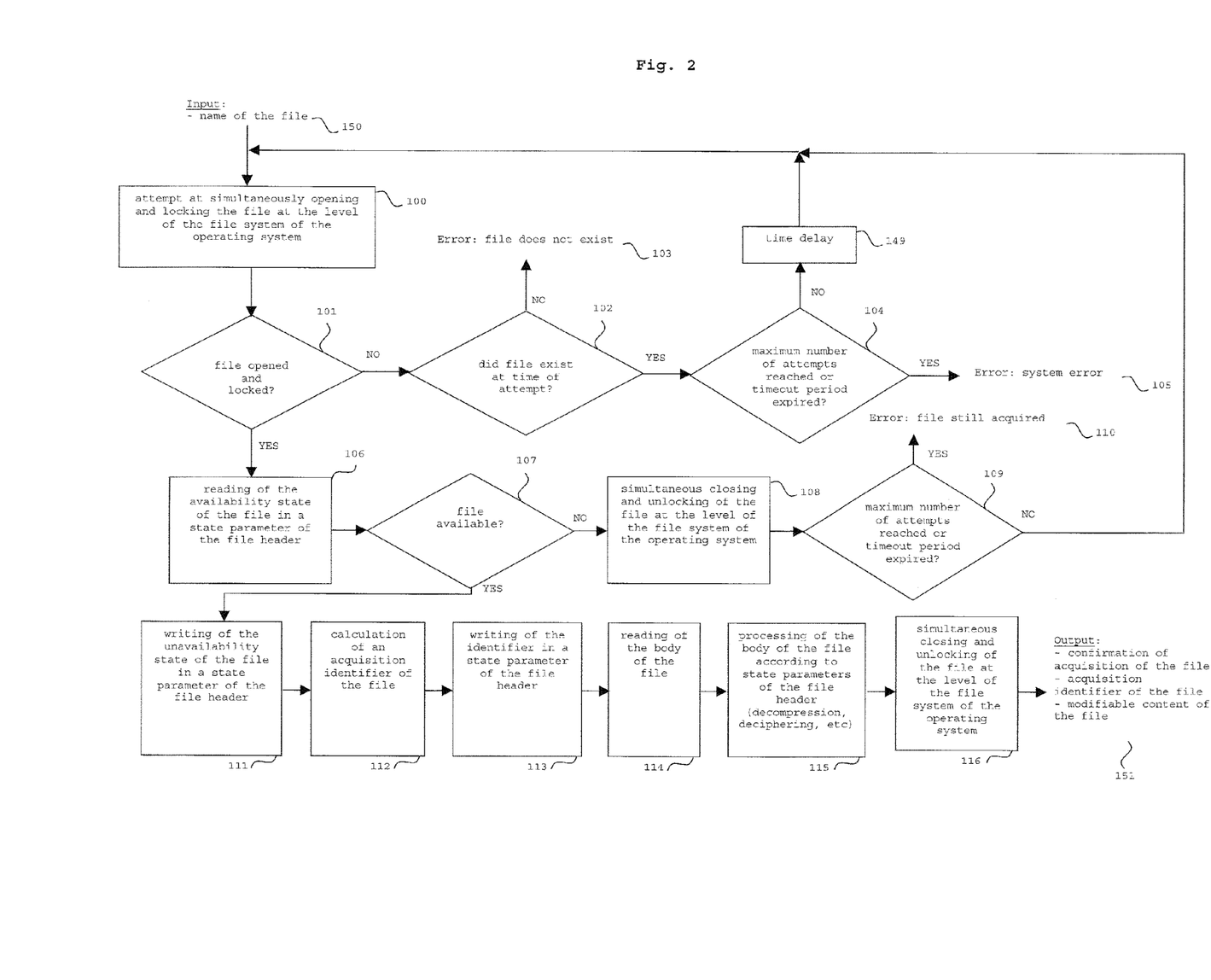
FIGS. 2 to 8 show the functional diagrams of the file management.

FIG. 2 shows the succession of tasks necessary for acquiring an existing data file.

The function takes as an input (150) the name of a file calculated from the use name as disclosed previously.

The first task (100) consists of attempting the simultaneous opening and locking of the file at the level of the file system of the operating system, by requesting the opening and locking of the file, thus preventing, until its closure and unlocking, the opening and locking of this file by a subsequent processing operation.

The function then proceeds with a test (101) for verifying the opening and locking of the file: if the file is not open and locked, the result of the test (101) is negative and the function proceeds with a second test (102) that checks whether the file existed during the attempt (100). In the case of a negative response, the function returns an error (103) indicating that the file does not exist.

In the case of a positive response, a test (104) checks whether the number of attempts (100) exceeds a threshold value, or whether the timeout period has expired, and undertakes a new attempt (100) after a time delay (149) in the case of a negative response; otherwise the function returns a system error (105).

If the result of the test (101) is positive, the function reads the availability state of the file in a state parameter of the file header during a task (106).

The function then proceeds with a test (107) on the availability of the file according to the state parameter.

If the result of the test (107) is negative, corresponding to an unavailability state, the function proceeds with a task (108) of the simultaneous closure and unlocking of the file at the level of the file system of the operating system.

The function then performs a test (109) that checks whether the number of attempts (100) exceeds a threshold value, or whether the timeout period has expired, and undertakes a new attempt (100) after a time delay (149) in the case of a negative response; otherwise the function returns an error (110) indicating that the file remains acquired by a current processing operation.

If the result of the test (107) is positive, the function proceeds with a task (111) of writing the unavailability state of the file in a state parameter of the file header, and then a task (112) of calculating a file acquisition identifier, a task (113) of writing this identifier in a state parameter of the file header, and a task (114) of reading the file body. The task (115) corresponds to a processing of the file body in order to extract the modifiable content of the file. This processing is carried out according to state parameters of the file header. It corresponds, for example, to a decompression or deciphering of the modifiable content of the file. The last task (116) consists of the simultaneous closing and unlocking of the file at the level of the file system of the operating system.

The function returns as an output at its completion (151) the confirmation of the acquisition of the data file, the file acquisition identifier and the modifiable content of the file.

Function of Acquiring a New Data File

Figure 3:
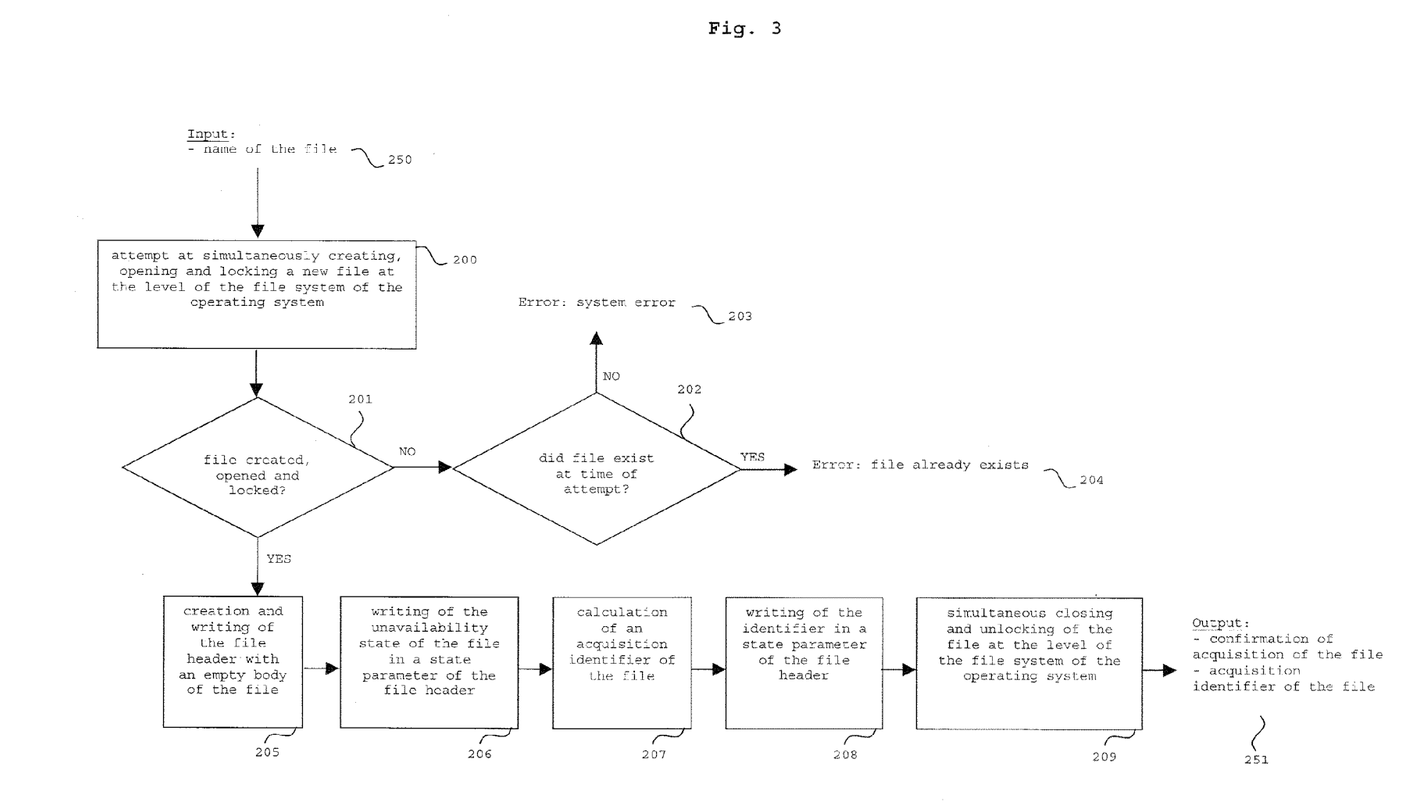

FIG. 3 shows the succession of tasks necessary for acquiring a new data file.

The function takes as an input (250) the name of a file calculated from the use name as disclosed previously.

The first task (200) consists of attempting the simultaneous creation, opening and locking of a new file at the level of the file system of the operating system, by requesting a creation, an opening and a locking of the file, thus preventing, until its closure and unlocking, the opening and locking of this file by a subsequent processing operation.

The function then proceeds with a test (201) for verifying the creation, opening and locking of the file: if the file is not created, opened or locked, the result of the test (201) is negative and the function proceeds with a second test (202) which checks whether the file existed during the attempt (200).

In the case of a positive response, the function returns an error (204) indicating that the file already exists.

In the case of a negative response, the function returns an error (203) indicating a system error.

If the result of the test (201) is positive, the function proceeds with a task (205) of creating and writing the file header with an empty body of the file, then a task (206) of writing the unavailability state of the file in a state parameter of the file header, and then a task (207) of calculating a file acquisition identifier, a task (208) of writing this identifier in a state parameter of the file header. The last task (209) consists of the simultaneous closing and unlocking of the file at the level of the file system of the operating system.

The function returns as an output on its completion (251) the confirmation of the acquisition of the data file and the file acquisition identifier.

Figure 4:
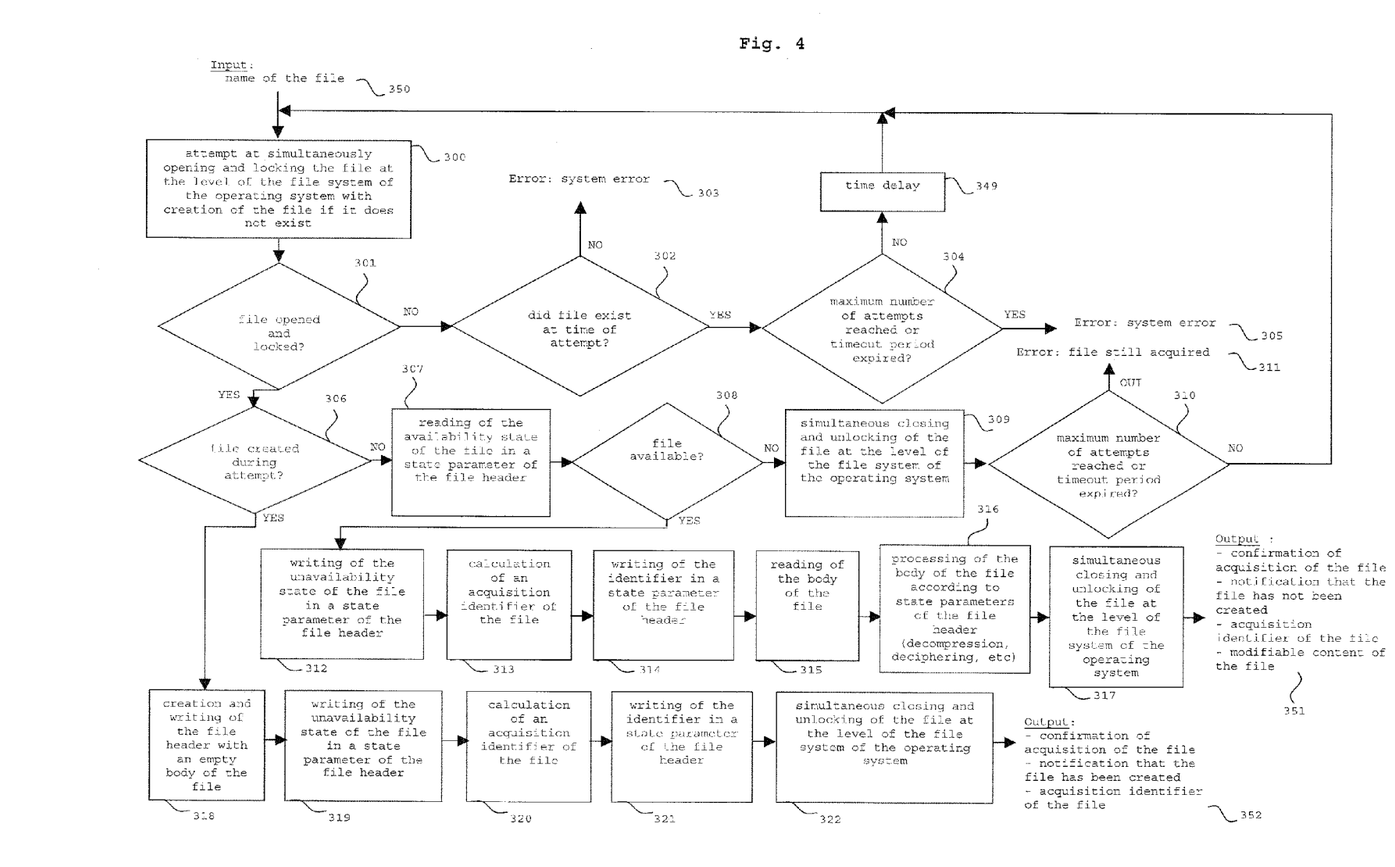

Function of Acquiring an Existing Data File with Creation of the File if it does not Exist FIG. 4 shows the succession of tasks necessary for acquiring an existing data file with creation of the file if it does not exist.

The function takes as an input (350) the name of the file calculated from the use name as disclosed previously.

The first task (300) consists of attempting the simultaneous opening and locking of the file at the level of the file system of the operating system, and creating the file if it does not exist, by requesting the opening and locking of the file, thus preventing, until its closure and unlocking, the opening and locking of this file by a subsequent processing operation.

The function then proceeds with a test (301) for verifying the opening and locking of the file: if the file is not open and locked, the result of the test (301) is negative and the function proceeds with a second test (302) that checks whether the file existed at the time of the attempt (300).

In the case of a negative response, the function returns a system error (303).

In the case of a positive response, a test (304) checks whether the number of attempts (300) exceeds a threshold value, or if the timeout period has expired, and undertakes a new attempt (300) after a time delay (349) in the case of a negative response; otherwise the function returns a system error (305).

If the result of the test (301) is positive, the function then proceeds with a test (306) for checking whether the file was created at the time of the attempt (300): if the file was not created, the result of the test (306) is negative and the function reads the availability state of the file in a state parameter of the file header during a task (307).

The function then proceeds with a test (308) on the availability of the file according to the state parameter.

If the result of the test (308) is negative, corresponding to an unavailability state, the function proceeds with a task (309) of the simultaneous closure and unlocking of the file at the level of the file system of the operating system.

The function then performs a test (310) that checks whether the number of attempts (300) exceeds a threshold value, or whether the timeout period has expired, and undertakes a new attempt (300) after a time delay (349) in the case of a negative response; otherwise the function returns an error (311) indicating that the file remains acquired by a current processing operation.

If the result of the test (308) is positive, the function proceeds with a task (312) of writing the unavailability state of the file in a state parameter of the file header, and then a task (313) of calculating a file acquisition identifier, a task (314) of writing this identifier in a state parameter of the file header and a task (315) of reading the body of the file. The task (316) corresponds to a processing of the file body in order to extract the modifiable content of the file. This processing takes place according to state parameters of the file header. It corresponds for example to a decompression or deciphering of the modifiable content of the file. The task (317) consists of the simultaneous closing and unlocking of the file at the level of the file system of the operating system.

The function returns as an output at its completion (351) the confirmation of the acquisition of the data file, a notification indicating that the file has not been created, the file acquisition identifier and the modifiable content of the file.

If the result of the test (306) is positive, the function proceeds with a task (318) of creating and writing the file header with an empty body of the file, then a task (319) of writing the unavailability state of the file in a state parameter of the file header, then a task (320) of calculating a file acquisition identifier, a task (321) of writing this identifier in a state parameter of the file header. The last task (322) consists of the simultaneous closing and unlocking of the file at the level of the file system of the operating system.

The function returns as an output at its completion (352) confirmation of the acquisition of the data file, a notification indicating that the file has been created and the file acquisition identifier.

Function of Releasing a Data File Acquired without Data Modification

Figure 5:
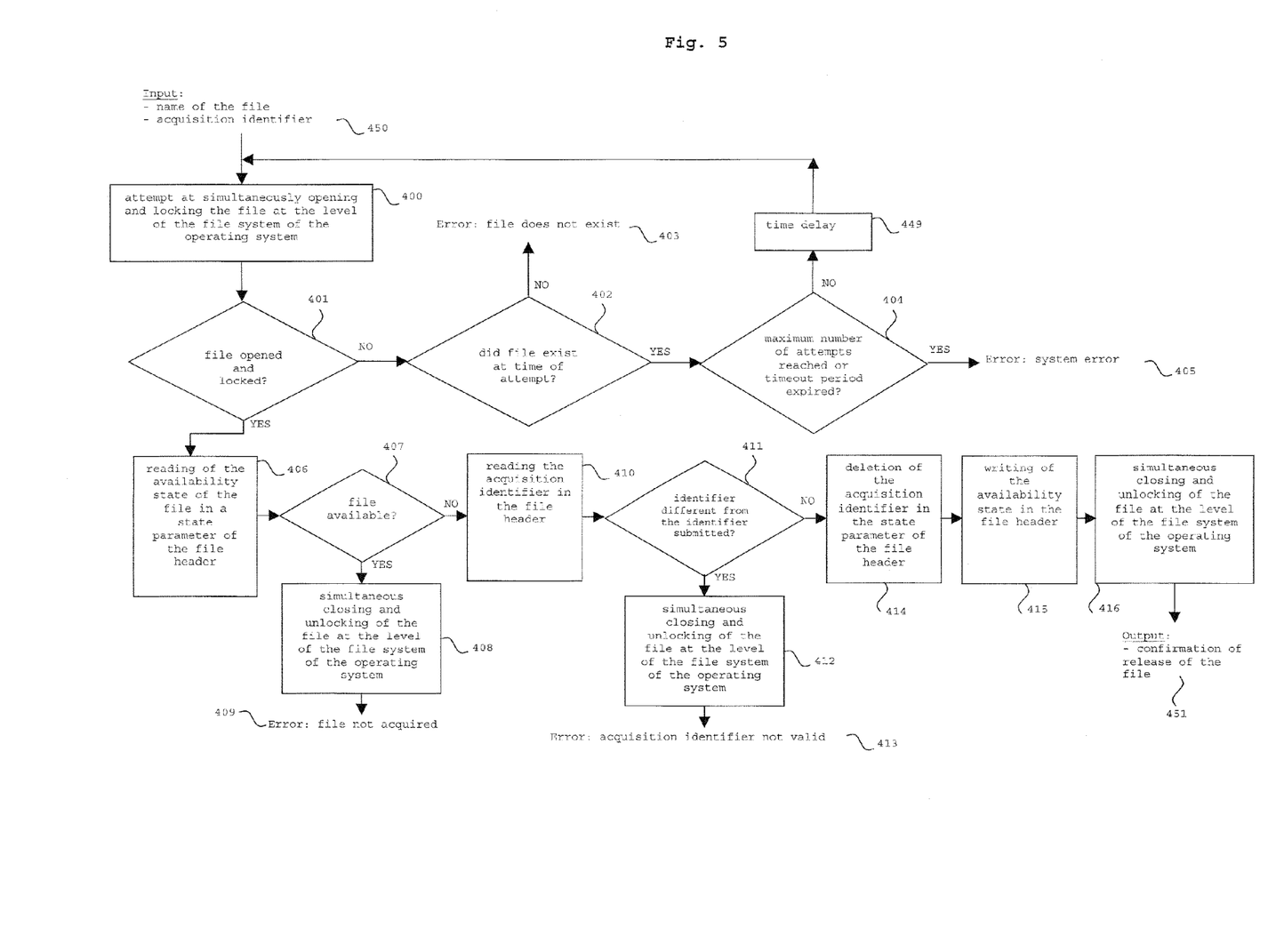

FIG. 5 shows the succession of tasks necessary for releasing a data file acquired without data modification.

The function takes as an input (450) the name of the file calculated from the use name as disclosed previously and an acquisition identifier returned during a previous acquisition of the data file.

The first task (400) consists of attempting the simultaneous opening and locking of the file at the level of the file system of the operating system, requesting an opening and locking of the file, thus preventing, until its closure and unlocking, the opening and locking of this file by a subsequent processing operation.

The function then proceeds with a test (401) for checking the opening and locking of the file: if the file is not open and locked, the result of the test (401) is negative and the function proceeds with a second test (402) that checks whether the file existed during the attempt (400). In the case of a negative response, the function returns an error (403) indicating that the file does not exist.

In the case of a positive response, a test (404) checks whether the number of attempts (400) exceeds a threshold value, or whether the timeout period has expired, and undertakes a new attempt (400) after a time delay (449) in the case of a negative response; otherwise the function returns a system error (405).

If the result of the test (401) is positive, the function reads the availability state of the file in a state parameter of the file header during a task (406).

The function then proceeds with a test (407) on the availability of the file according to the state parameter.

If the result of the test (407) is positive, the function proceeds with a task (408) of the simultaneous closing and unlocking of the file at the level of the file system of the operating system and returns an error (409) indicating that the file is not acquired.

If the result of the test (407) is negative, corresponding to an unavailability state, the function reads the acquisition identifier in the file header during a task (410).

The function then performs a test (411) that checks whether this identifier is different from the identifier submitted as an input. In the case of a positive response, the function proceeds with a task (412) of the simultaneous closing and unlocking of the file at the level of the file system of the operating system and returns an error (413) indicating that the acquisition identifier submitted as an input is not valid.

In the case of a negative response, the function proceeds with a task (414) of deleting the acquisition identifier in the state parameter of the file header and then a task (415) of writing the availability state in the file header. The last task (416) consists of the simultaneous closing and unlocking of the file at the level of the file system of the operating system.

The function returns as an output on its completion (451) confirmation of the release of the data file.

Function of Releasing a Data File Acquired with Data Modification

Figure 6:
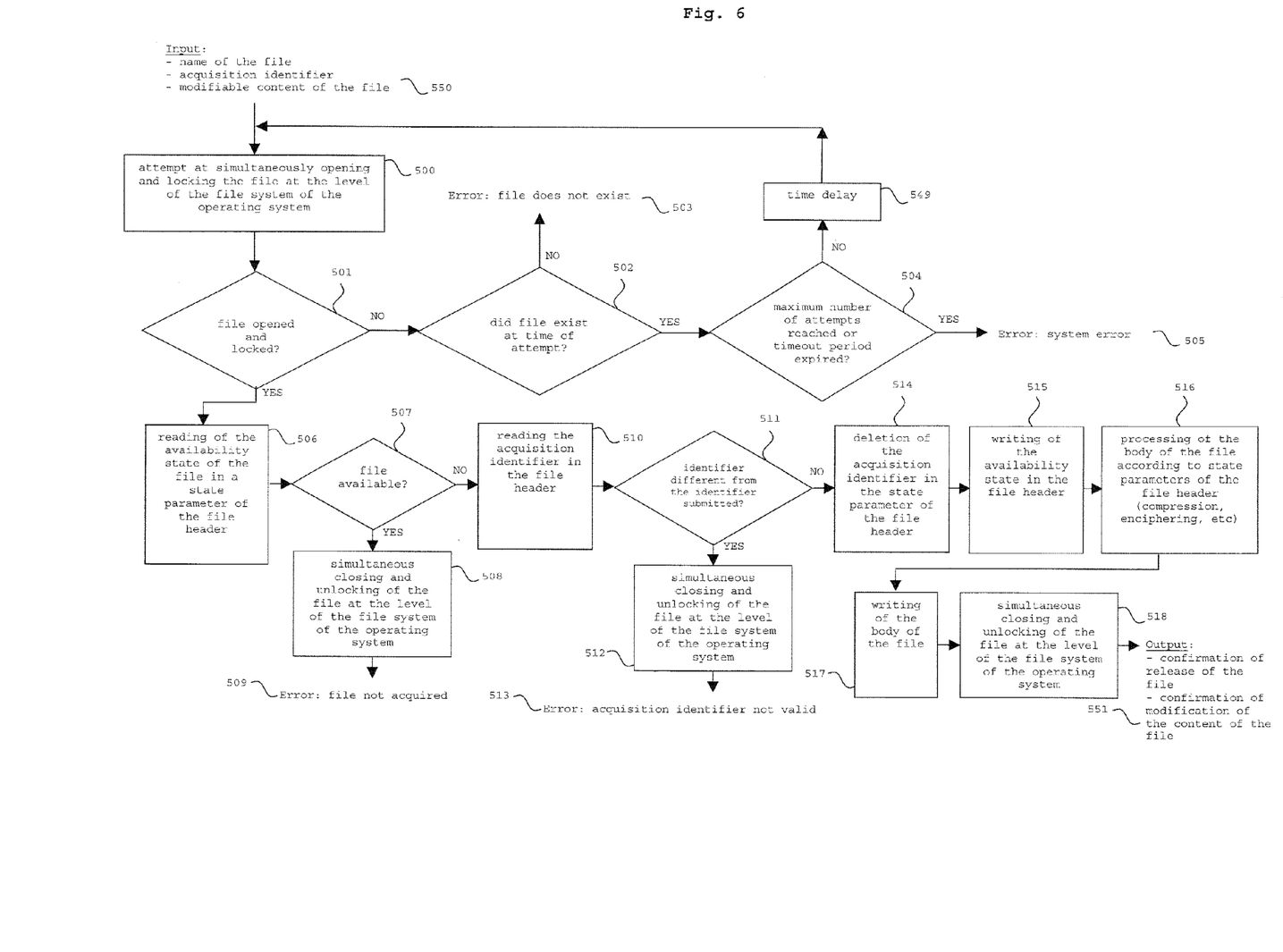

FIG. 6 shows the succession of tasks necessary for releasing a data file acquired with data modification.

The function takes as an input (550) the name of a file calculated from the use name as disclosed previously, an acquisition identifier returned during a previous acquisition of the data file and the modifiable content of the file.

The first task (500) consists of attempting the simultaneous opening and locking of the file at the level of the file system of the operating system, requesting an opening and locking of the file, thus preventing, until its closure and unlocking, the opening and locking of this file by a subsequent processing operation.

The function then proceeds with a test (501) for checking the opening and locking of the file: if the file is not open and locked, the result of the test (501) is negative and the function proceeds with a second test (502) that checks whether the file existed during the attempt (500). In the case of a negative response, the function returns an error (503) indicating that the file does not exist.

In the case of a positive response, a test (504) checks whether the number of attempts (500) exceeds a threshold value, or whether the timeout period has expired, and undertakes a new attempt (500) after a time delay (549) in the case of a negative response; otherwise the function returns a system error (505).

If the result of the test (501) is positive, the function reads the availability state of the file in a state parameter of the file header during a task (506).

The function then proceeds with a test (507) on the availability of the file according to the state parameter.

If the result of the test (507) is positive, the function proceeds with a task (508) of the simultaneous closing and unlocking of the file at the level of the file system of the operating system and returns an error (509) indicating that the file is not acquired.

If the result of the test (507) is negative, corresponding to an unavailability state, the function reads the acquisition identifier in the file header during a task (510).

The function then performs a test (511) that checks whether this identifier is different from the identifier submitted as an input. In the case of a positive response, the function proceeds with a task (512) of the simultaneous closing and unlocking of the file at the level of the file system of the operating system and returns an error (513) indicating that the acquisition identifier submitted as an input is not valid.

In the case of a negative response, the function proceeds with a task (514) of deleting the acquisition identifier in the state parameter of the file header, then a task (515) of writing the availability state in the file header, and then a task (516) corresponding to a processing of the file body in order to insert therein the modifiable content of the file. This processing takes place according to state parameters of the file header and corresponds, for example, to a compression or enciphering of the modifiable content of the file. The function then proceeds with a task (517) of writing the file body and the last task (518) consists of the simultaneous closing and unlocking of the file at the level of the file system of the operating system.

The function returns as an output on its completion (551) confirmation of the release of the data file and modification of the file content.

Function of Releasing a Data File Acquired with Deletion of the File

Figure 7:
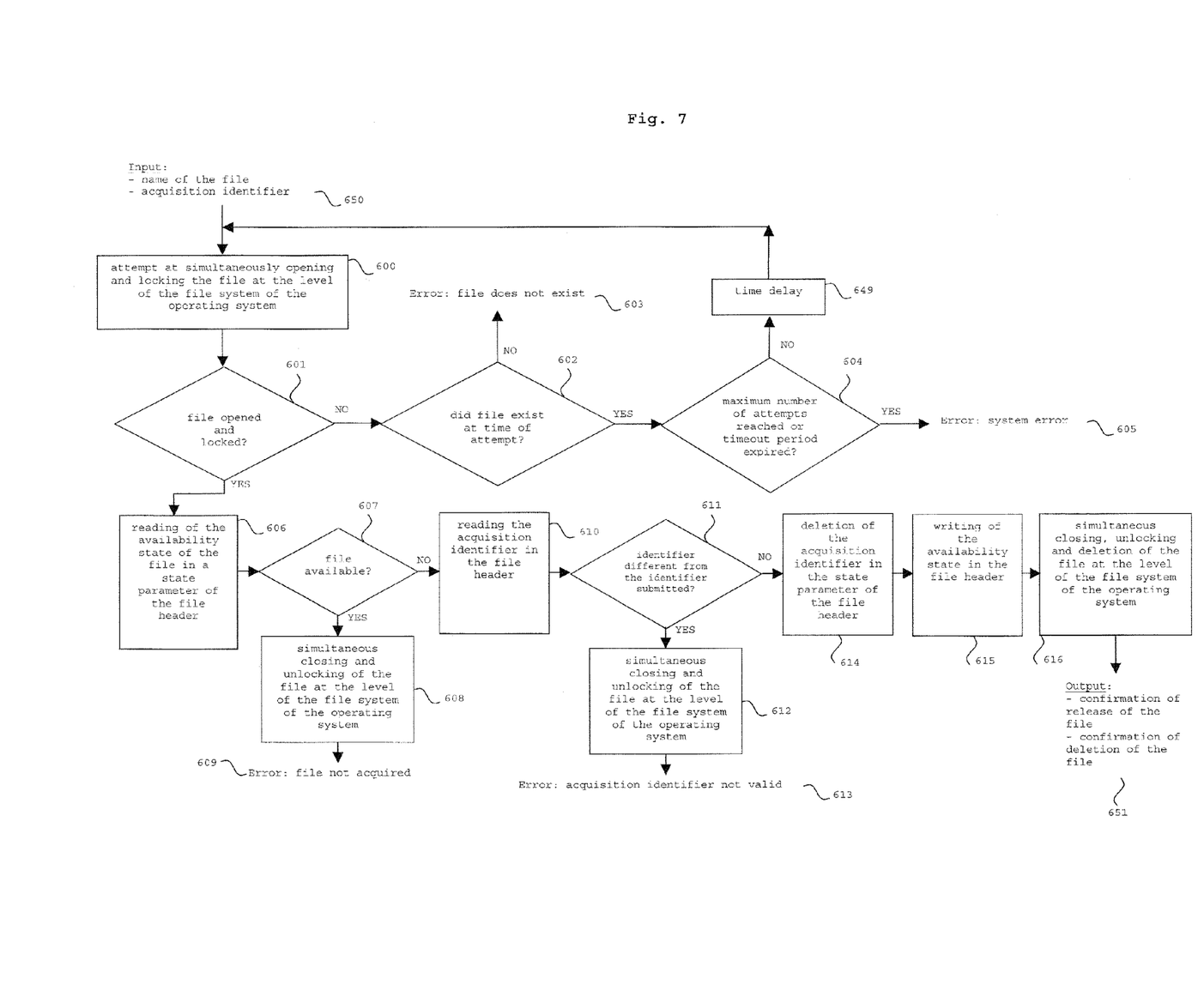

FIG. 7 shows the succession of tasks necessary for releasing a data file acquired with deletion of the file.

The function takes as an input (650) the name of the file calculated from the use name as disclosed previously and an acquisition identifier returned during a previous acquisition of the data file.

The first task (600) consists of attempting the simultaneous opening and locking of the file at the level of the file system of the operating system, requesting an opening and locking of the file, thus preventing, until its closure and unlocking, the opening and locking of this file by a subsequent processing operation.

The function then proceeds with a test (601) for checking the opening and locking of the file: if the file is not open and locked, the result of the test (601) is negative and the function proceeds with a second test (602) that checks whether the file existed during the attempt (600). In the case of a negative response, the function returns an error (603) indicating that the file does not exist.

In the case of a positive response, a test (604) checks whether the number of attempts (600) exceeds a threshold value, or whether the timeout period has expired, and undertakes a new attempt (600) after a time delay (649) in the case of a negative response; otherwise the function returns a system error (605).

If the result of the test (601) is positive, the function reads the availability state of the file in a state parameter of the file header during a task (606).

The function then proceeds with a test (607) on the availability of the file according to the state parameter.

If the result of the test (607) is positive, the function proceeds with a task (608) of the simultaneous closing and unlocking of the file at the level of the file system of the operating system and returns an error (609) indicating that the file is not acquired.

If the result of the test (607) is negative, corresponding to an unavailability state, the function reads the acquisition identifier in the file header during a task (610).

The function then performs a test (611) that checks whether this identifier is different from the identifier submitted as an input. In the case of a positive response, the function proceeds with a task (612) of the simultaneous closing and unlocking of the file at the level of the file system of the operating system and returns an error (613) indicating that the acquisition identifier submitted as an input is not valid.

In the case of a negative response, the function proceeds with a task (614) of deleting the acquisition identifier in the state parameter of the file header, and then a task (615) of writing the availability state in the file header. The last task (616) consists of the simultaneous closing, unlocking and deleting of the file at the level of the file system of the operating system.

The function returns as an output on its completion (651) confirmation of the release of the date data file and its deletion.

Figure 8:
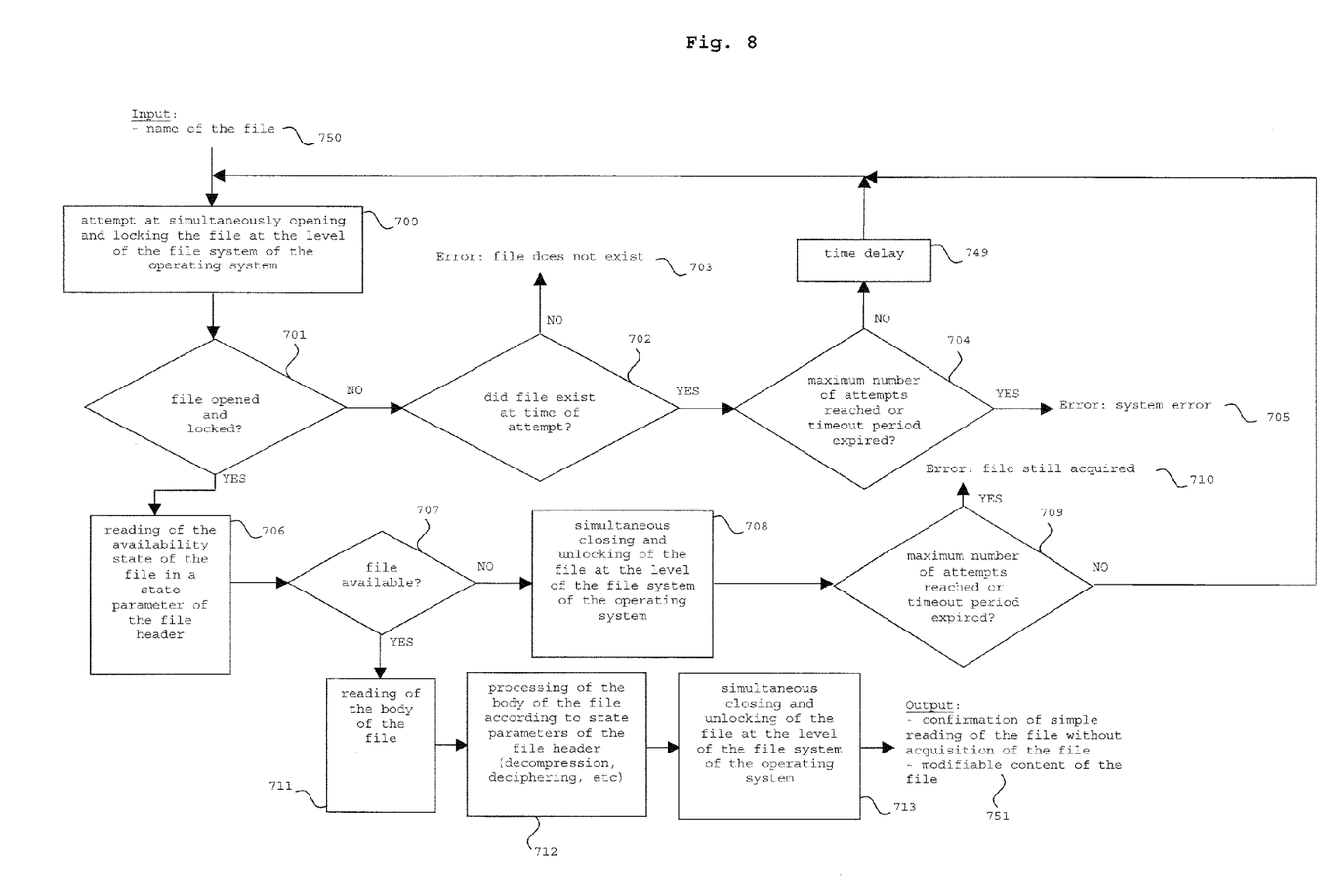

Function of the Simple Reading of an Existing Data File Without Acquisition of the File FIG. 8 shows the succession of tasks necessary for the simple reading of an existing data file without acquisition of the file.

The function takes as an input (750) the name of a file calculated from the use name as disclosed previously.

The first task (700) consists of attempting the simultaneous opening and locking of the file at the level of the file system of the operating system, requesting an opening and locking of the file, thus preventing, until its closure and unlocking, the opening and locking of this file by a subsequent processing operation.

The function then proceeds with a test (701) for checking the opening and locking of the file: if the file is not open and locked, the result of the test (701) is negative and the function proceeds with a second test (702) that checks whether the file existed during the attempt (700). In the case of a negative response, the function returns an error (703) indicating that the file does not exist.

In the case of a positive response, a test (704) checks whether the number of attempts (700) exceeds a threshold value, or whether the timeout period has expired, and undertakes a new attempt (700) after a time delay (749) in the case of a negative response; otherwise the function returns a system error (705).

If the result of the test (701) is positive, the function reads the availability state of the file in a state parameter of the file header during a task (706).

The function then proceeds with a test (707) on the availability of the file according to the state parameter.

If the result of the test (707) is negative, corresponding to an unavailability state, the function proceeds with a task (708) of the simultaneous closing and unlocking of the file at the level of the file system of the operating system.

The function then performs a test (709) that checks whether the number of attempts (700) exceeds a threshold value, or whether the timeout period has expired, and undertakes a new attempt (700) after a time delay (749) in the case of a negative response; otherwise the function returns an error (710) indicating that the file remains acquired by a current processing operation.

If the result of the test (707) is positive, the function proceeds with a task (711) of reading the file body, and then a task (712) of processing the file body in order to extract the modifiable content of the file. This processing takes place according to state parameters of the file header. It corresponds, for example, to a decompression or deciphering of the modifiable content of the file. The last task (713) consists of the simultaneous closing and unlocking of the file at the level of the file system of the operating system.

The function returns as an output on its completion (751) confirmation of the simple reading of the data file and the modifiable content of the file.

Other functions facilitate the administration of the tree, in particular:
the reading of the state parameters of the header of a data file, including the availability state of the file,
the forced release of a data file that has not been released by a processing operation,
the listing of the data files contained in the tree by subsets of the tree.

Client-Server Mode

Figure 9:
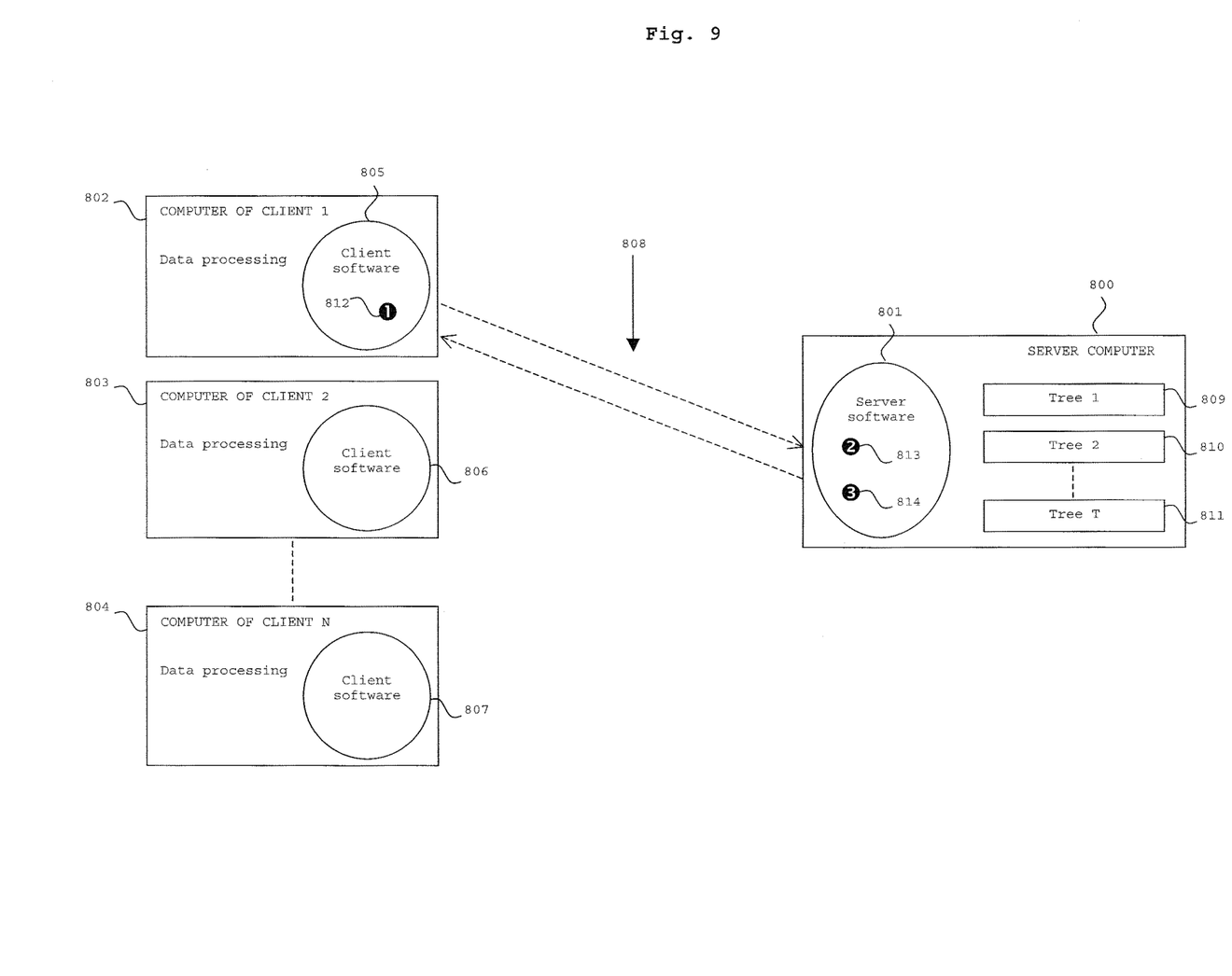
FIG. 9 shows the diagram for use of the file management system over a network, corresponding to a client/server mode.

FIG. 9 concerns a case of a particular and preferred application. It shows the succession of tasks necessary for the use of the file management system according to the invention over a network, corresponding to a client-server mode.

In this case, the file management system is installed on a server computer (800) that comprises server software (801). The server computer is accessible by a plurality of client computers (802 to 804) each of which comprise client software (805 to 807). The exchanges between the client software and the server software use a network transport protocol of a known type, for example HTTP or preferably a secure protocol of the HTTPS type.

The invention in this case uses an application protocol (808) for calling the functions of the file management system according to the invention by commands of the "file acquisition" or "file release" type. The files are distributed at the level of the server computer in several subsets (809 to 811), each subset corresponding to a tree according to the invention, called a "table". The use name of the data file is designated in the protocol by "key".

The first task (812) is executed on one of the client computers by the client software. It consists of calling an acquisition, release or simple reading function relating to a table and a key.

The second task (813) is executed by the server software on the server computer. It consists of executing the function requested by the client software.

The third task (814) is executed by the server software on the server computer. It consists of returning to the client software the result of the function requested. Optionally, the system comprises several servers for distributing the storage volume and load of the data. In this case, the client software (805 to 807) comprises rules for selecting the server according to the tables and keys.

The server software (801) can also comprise functionalities of logging of the operations executed to allow incremental reconstruction of the trees of the server computer on a backup computer without making a complete copy of the trees on the backup computer.

The invention claimed is:

1. A file management method for data files, the file management method comprising:
creating a tree of directories with M levels, the M levels numbered from 1 to M, with M being an integer greater than 1,
wherein the tree includes N directories of level 1, with N being an integer greater than 1,
wherein for each level X from 1 to M−1, each one of the directories of level X includes N directories of level X+1, and
wherein files are only stored in directories of level M;
recording a first data file of the data files, including:
applying a hash function to an identifier of the first data file,
determining a path in the tree of a destination directory of level M according to the result of the hash function,
recording the first data file in the destination directory; and
reading a second data file of the data files, including:
applying the hash function to an identifier of the second data file,
determining a path in the tree of a target directory according to the result of the hash function;
attempting simultaneous opening and locking of the second data file from the target directory using a single operation of a file system, wherein in response to the simultaneous opening and locking of the second data file being successful, the file system prevents further opening of the second data file until the second data file is unlocked; and
in response to the simultaneous opening and locking of the second data file being successful,
(i) reading a state parameter of the second data file;
(ii) in response to the state parameter indicating that the second data file is unavailable, closing and unlocking the second data file;
(iii) in response to the state parameter indicating that the second data file is available:
modifying the state parameter to indicate unavailability of the second data file,
calculating a first acquisition identifier, and
writing the first acquisition identifier to the second data file; and
closing and unlocking the second data file.

2. The file management method according to claim 1, wherein the data files are distributed over Q storage units, and wherein each of the Q storage units stores the data files of a sub-tree of P directory levels, wherein P is an integer greater than one.

3. The file management method according to claim 1, wherein N is equal to 16 and the hash function is the SHA-1 function.

4. The file management method according to claim 1, wherein:
  each data file of the data files comprises a header and a body, the body comprising modifiable content of the data file, the header comprising state parameters of the data file, and
  the modifying the state parameter to indicate unavailability of the second data file includes modifying the header of the second data file.

5. A method comprising:
  constructing a tree of directories including M levels, wherein:
    M is an integer greater than 1;
    the tree includes a set of N directories of level 1;
    N is an integer greater than 1; and
    for each level X from 1 to M−1, each one of the directories of level X includes a set of N directories of level X+1;
  storing a first file having a first identifier by:
    applying a hash function to the first identifier to generate a first hash;
    selecting a destination directory from level M by traversing the tree in response to the first hash; and
    storing the first file into the destination directory; and
  attempting to acquire the first file by
    attempting simultaneous opening and locking of the first file using a single operation of an underlying file system; and
    in response to the simultaneous opening and locking of the first file being successful,
      (i) reading a state parameter of the first file;
      (ii) in response to the state parameter indicating that the first file is unavailable, closing and unlocking the first file;
      (iii) in response to the state parameter indicating that the first file is available:
        modifying the state parameter to indicate unavailability of the first file,
        calculating a first acquisition identifier, and
        writing the first acquisition identifier to the first file; and
        closing and unlocking the first file.

6. The method of claim 5, wherein the first hash includes M portions and wherein the tree is traversed by, at each of the M levels, selecting a directory using a corresponding one of the M portions.

7. The method of claim 6, wherein each of the M portions includes B bits, wherein B is an integer greater than 1, and wherein N is equal to $2^B$.

8. The method of claim 7, wherein B is equal to 4, N is equal to 16, and each set of N directories is named using 16 hexadecimal digits, one hexadecimal digit for each directory in the set.

9. The method of claim 6, wherein each of the M portions can assume one of T values, wherein N is equal to T, and wherein each set of N directories is named using the T values, one of the T values for each directory.

10. The method of claim 5, wherein the constructing the tree of directories is performed using the file system without modifying the file system.

11. The method of claim 5, further comprising retrieving a second file having a second identifier by:
  applying the hash function to the second identifier to generate a second hash;
  selecting a target directory from level M by traversing the tree in response to the second hash; and
  attempting simultaneous opening and locking of the second file from the target directory using the single operation of the file system.

12. The method of claim 5, wherein the first identifier is a file name of the first file.

13. The method of claim 5, further comprising deleting the first file by:
  subsequent to successfully acquiring the first file, attempting simultaneous opening and locking of the first file using the single operation of the file system; and
  in response to the simultaneous opening and locking of the first file being successful:
    reading the state parameter,
    in response to the state parameter indicating that the first file is available, closing and unlocking the first file, and
    in response to the state parameter indicating that the first file is unavailable, (i) reading an acquisition identifier from the first file, and (ii) in response to the read acquisition identifier matching the first acquisition identifier, closing, unlocking, and deleting the first file.

14. The method of claim 5, further comprising modifying data of the first file by:
  subsequent to successfully acquiring the first file, attempting simultaneous opening and locking of the first file using the single operation of the file system; and
  in response to the simultaneous opening and locking of the first file being successful,
    reading the state parameter;
    in response to the state parameter indicating that the first file is available, closing and unlocking the first file; and
    in response to the state parameter indicating that the first file is unavailable, (i) reading an acquisition identifier from the first file, and (ii) in response to the read acquisition identifier matching the first acquisition identifier, writing modified data to the first file and closing and unlocking the first file.

15. The method of claim 5, further comprising relinquishing acquisition of the first file by:
  subsequent to successfully acquiring the first file, attempting simultaneous opening and locking of the first file using the single operation of the file system; and
  in response to the simultaneous opening and locking of the first file being successful,
    reading the state parameter;
    in response to the state parameter indicating that the first file is available, closing and unlocking the first file; and
    in response to the state parameter indicating that the first file is unavailable, (i) reading an acquisition identifier from the first file, and (ii) in response to the read acquisition identifier matching the first acquisition identifier, clearing the acquisition identifier from the first file, modifying the state parameter to indicate availability of the first file, and closing and unlocking the first file.

16. The method of claim 5, further comprising reading from a second file by:
  attempting simultaneous opening and locking of the second file using the single operation of an underlying file system; and
  in response to the simultaneous opening and locking of the second file being successful:
    reading data from the second file; and
    closing and unlocking the second file.

17. The method of claim 5, further comprising creating a new file by:
- attempting simultaneous creating, opening, and locking of the new file using a different single operation of the file system; and
- in response to the simultaneous creating, opening, and locking being successful,
  - calculating a first acquisition identifier,
  - writing the first acquisition identifier to the first file, and
  - closing and unlocking the first file.

18. The method of claim 5, further comprising, in response to the simultaneous opening and locking of the first file being unsuccessful:
- carrying out a time delay; and
- subsequent to the time delay, attempting simultaneous opening and locking of the first file using the single operation.

* * * * *